United States Patent [19]

Weisel et al.

[11] Patent Number: 4,860,919
[45] Date of Patent: Aug. 29, 1989

[54] BI-DIRECTIONAL SEALED NOZZLE DAM

[75] Inventors: Eric M. Weisel, Windsor Locks; Glen E. Schukei, Windsor, both of Conn.

[73] Assignee: Combustion Engineering, Inc., Windsor, Conn.

[21] Appl. No.: 225,973

[22] Filed: Jul. 29, 1988

[51] Int. Cl.⁴ ............................................. F16L 55/10
[52] U.S. Cl. ........................................ 220/240; 138/89; 277/102; 376/204
[58] Field of Search .................. 138/89; 220/315, 240, 220/378; 277/27, 102, 103; 376/203–205

[56] References Cited

U.S. PATENT DOCUMENTS

| 3,613,936 | 10/1971 | Kaiser et al. | 138/89 |
| 3,747,541 | 7/1973 | Reese | 138/89 |
| 4,470,946 | 9/1984 | Vassalotti et al. | 376/204 |
| 4,585,033 | 4/1986 | Westman | 138/89 |
| 4,671,326 | 6/1987 | Wilhelm et al. | 376/204 |
| 4,682,630 | 7/1987 | Schukel | 138/89 |
| 4,690,172 | 9/1987 | Everett | 376/204 |
| 4,739,799 | 4/1988 | Carney et al. | 138/89 |
| 4,777,008 | 10/1988 | Shirasu | 376/204 |

Primary Examiner—Jimmy G. Foster
Attorney, Agent, or Firm—John H. Mulholland

[57] ABSTRACT

A nuclear steam supply steam generator primary nozzle 16 is sealed by a nozzle dam having segmented bulkhead portions 42 and 45 with peripheral flanges 46,50,52. A rubber diaphragm with a body 54 and peripheral strata form oppositely opening cavities 56 and 58. Hydraulic pressure from either side enters one of the cavities to create a radial sealing force against the inside surface of nozzle 16. A closed cell foam rubber sealing material 76 of 20 to 30 durometer can be interposed between the cavity defining strata and the surface 16 to improve sealing. A hinged retaining ring 70 is pinned to hold the nozzle dam against radial surface 68 machined in nozzle 16.

11 Claims, 2 Drawing Sheets

BI-DIRECTIONAL SEALED NOZZLE DAM

FIELD OF THE INVENTION

The present invention relates to an improvement in nozzle dams for steam generators of the type in association with a conventional nuclear power generating system. Nozzle dams are used to provide a temporary liquid tight seal in a nozzle of a steam generator to isolate the generator from the nuclear reactor with which it is associated.

BACKGROUND OF THE INVENTION

To employ a plug to affect blockage of a normally open flow passage for repair purposes has been known in the prior art in connection with many types of fluid flow systems. Examples of expansible plugs or dams of the prior art may be found in U.S. Pat. Nos. 2,843,154; 3,834,422; and 4,518,015. From these concepts, which are generally applicable to flow passageways, nozzle plugs for steam generators of conventional nuclear power generating systems have developed. Examples of such a nozzle plug for effecting a temporary blockage of a passage into or out of a nuclear power system steam generator will be found in U.S. Pat. No. 4,482,076 to Timothy H. Wentzell, assigned to Combustion Engineering, Inc., the assignee of the instant invention and U.S. patent application Ser. No. 128,235, filed Dec. 3, 1987, by John T. Lewis and Harold R. Zumbrun, also assigned to Combustion Engineering, Inc., the assignee of the instant invention.

Periodically, there arises a need to conduct maintenance on, and to effect minor reports of, the internal components of the steam generator. To accomplish such tasks, it is necessary for one or more persons to physically enter the steam generator. Ingress and egress to and from the steam generator by such persons is accomplished through suitable means such as, for example, an access port or manway. While such persons are working in the steam generator, it is desirable that a blockage of the inlet and outlet nozzle of the steam generator be effected to ensure that there will be no fluid flow through the steam generator which might physically imperil the people working therein.

One such design of a nozzle plug for a nuclear steam generator is disclosed in the U.S. Pat. No. 4,482,076 mentioned above. In that design, a plurality of plate sections or segments are assembled within the steam generator to form the plug or nozzle dam. U.S. Pat. No. 4,483,457 to Schukei and Tade discloses a variation from the Wentzell patent in that it provides for the segments of the nozzle dams to be hinged together.

Both of these patents teach dams which rely upon inflatable seals that require a regulated air supply. See also U.S. Pat. No. 4,566,714. The air supply lines go through the manway and make entry and exit difficult for workers. In addition, there are situations where the hoses and fittings are inadvertently damaged, and since the system remains connected to the air supply lines to maintain pressure on the diaphragm and within the inflatable seal around the periphery of the diaphragm, this can cause leakage.

Moreover, in order to inflate the diaphragm and seals, air lines must be connected from the diaphragm to a regulated air supply outside the primary head of the heat exchanger. The obstruction caused by the air lines in the manway slows down the work effort in the high radiation area of the primary head cavity and is, therefore, extremely detrimental. The removal of the air lines from the work area in the primary head cavity and the manway provides a much more efficient work area. The nozzle dam system can be greatly simplified if there is an elimination of the prior art air supply system for sealing nozzle dams.

SUMMARY OF THE INVENTION

The present invention provides a seal for nozzle dams which does not require a regulated air supply system, and thus: eliminates air lines that go through the manway and inhibit the entry and exit of workers; eliminates the hoses and fittings in the work area in the primary head thereby decreasing radiation exposure and increasing worker efficiency; and eliminates the cost of setting up and maintaining a regulated air supply system. Furthermore, it seals against hydraulic forces from either side of the dam.

The passive nozzle dam of the invention for use in sealing a steam generator nozzle includes means in the form of interfitting aluminum bulkhead segments which form an inside bulkhead portion on one side of the sealing diaphragm body portion and segments which form an outside bulkhead portion on the other side of the sealing diaphragm. The latter bulkhead portion includes a peripheral flange which backs up a peripheral portion of the diaphragm seal means lying between the flange and a machined cylindrical portion on the inside of the nozzle. The assembled parts are held in place by a hinged retaining ring pinned in pockets in the nozzle surface and abut against a radial surface which defines the inside end of the nozzle sealing seat.

The seal means includes integral strata around the periphery of the molded radiation resistant synthetic rubber (EPDM) flexible material which strata define separate and oppositely facing cavities whereby hydraulic forces from either side of said dam creates a force in one of said cavities and on at least one of said strata to create a seal between the peripheral flange and the inside cylindrical surface portion of the nozzle. A closed cell foam material of 20 to 30 durometer rubber is preferably interposed as a strata between the cavities and the cylindrical surface. A stiffening means is provided in yet another cavity between strata and is in the form of a spring or an air pressure retention pocket.

DESCRIPTION OF THE PREFERRED EMBODIMENTS

Figure 1:
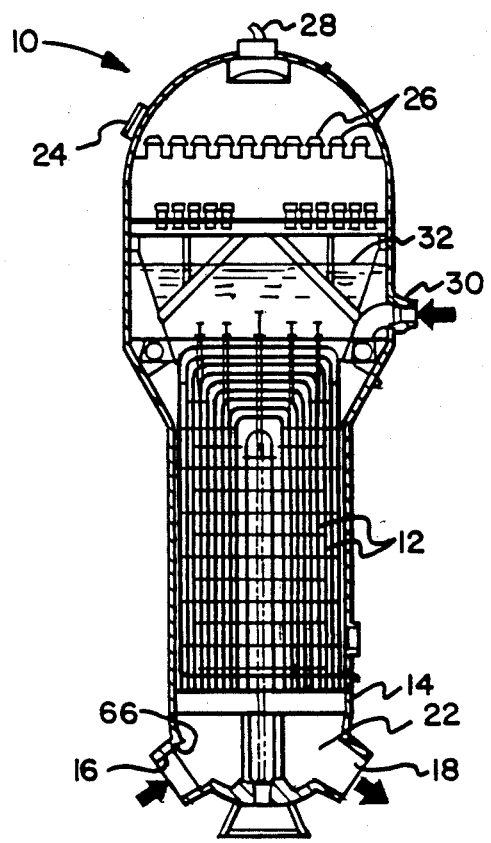
FIG. 1 is a schematic elevational view of the steam generator of a nuclear steam supply system.
Figure 2:
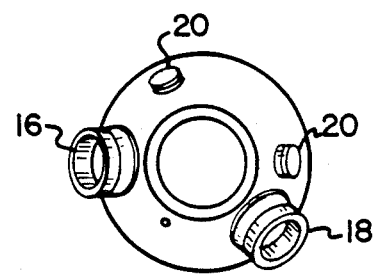
FIG. 2 is a bottom view of the steam generator of FIG. 1.

The numeral 10 generally designates a steam generator of a nuclear steam supply system. The generator 10 is a heat exchanger having a primary side in communication with a nuclear reactor (not shown) and a secondary side in communication with power generation equipment (not shown).

A bundle of U-shaped heat exchanging tubes 12 in fluid communication with the primary side extend into the secondary side and begin and end at a tubesheet 14. Primary inlet 16 and primary outlet 18 lie below tubesheet 14. Primary manways 20 provide worker access to a primary chamber or plenum 22 below tubesheet 14.

On the secondary side, the secondary manway 24 is provided for access to internal structure such as dryers 26. A steam outlet 28 is provided as is a feedwater inlet 30 for maintaining the normal secondary side water level, as indicated at 32.

Figure 3:
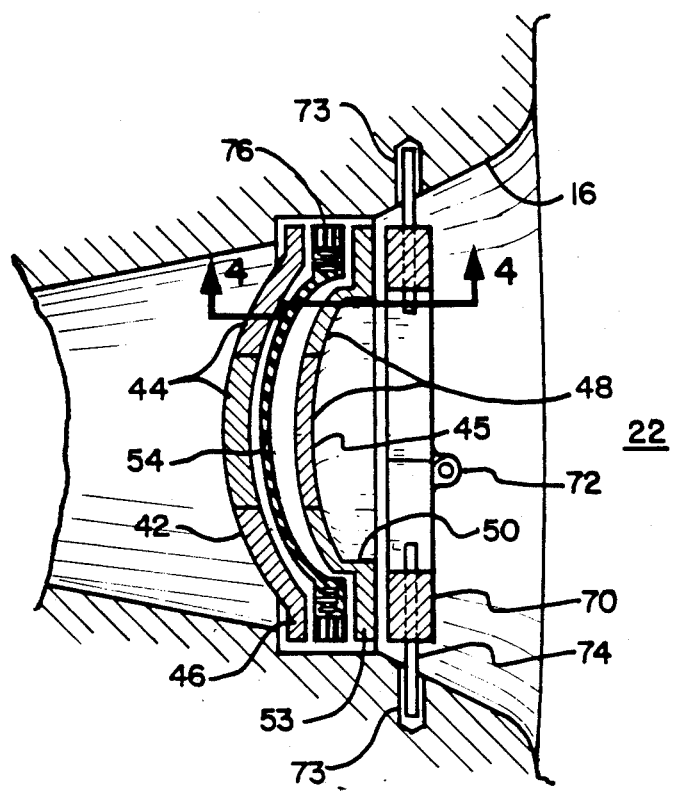
FIG. 3 is a schematic cross-sectional elevation of a nozzle dam constructed according to the principals of the invention in place in a nozzle of the steam generator of the type shown in FIG. 1.
Figure 4:
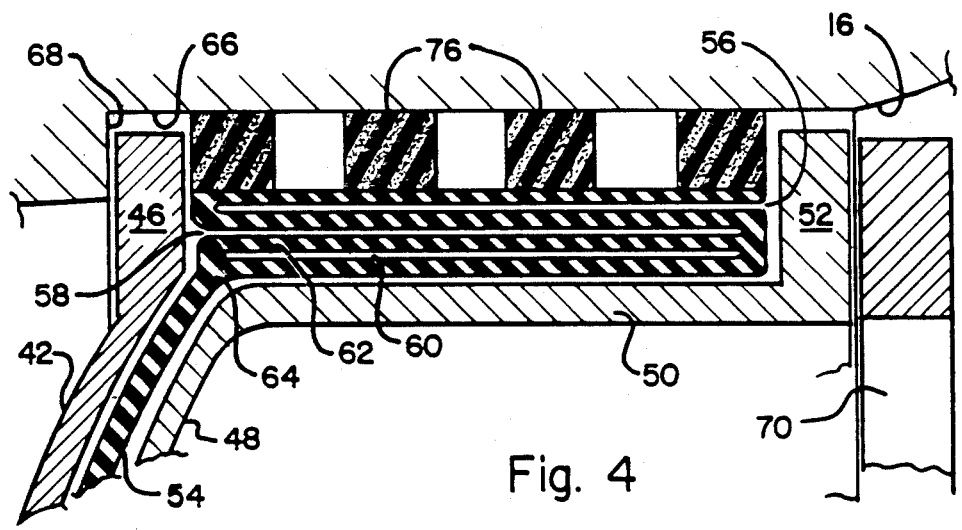
FIG. 4 is a cross-sectional view taken along the line 4—4 of FIG. 3.

The passive "chevron-type" nozzle dam sealing system of the invention is for use in steam generator nozzles such as primary inlet nozzle 16, for example. It utilizes a combined mechanical pinned retaining ring locking system and hydraulic flexible stratum sealing system. Water being dammed exerts a radial force to press the diaphragm peripheral seals toward the wall or inside surface defining nozzle 16 regardless of the direction from which the hydraulic forces originate, the reactor, which is to the left side in FIGS. 3 and 4, or the steam generator plenum 22, which is to the right side in FIGS. 3 and 4.

The nozzle dam for use in closing off the nozzle 16 is generally designated by the numeral 40. A first bulkhead portion 42 is located on the reactor side of the dam assembly. A second bulkhead portion 45 is located on the steam generator side of the bulkhead assembly. The bulkhead portion 42 is made up of aluminum segments 44 which have peripheral flange portions 46. The bulkhead portion 45 is made up of aluminum segments 48 which include peripheral flange portions 50 extending in a horizontal direction in face-to-face relation to nozzle surface 16. Flange portion 52 extends in a vertical direction, as do the flange portions 46 of bulkhead portion 42.

A seal means is provided of flexible elastomeric material, including a bulkhead sealing body portion 54 between the segmented bulkhead portions 42 and 45 and an integral peripheral seal portion having separate strata to create a seal portion between the surface of peripheral flange portion 50 and the inside surface 16 of the nozzle. The seal means is bi-directional whereby hydraulic forces from either side of the bulkhead of the nozzle dam creates a radially outward force in either cavity 56, which opens toward the steam generator plenum 22 or cavity 58 which opens toward the reactor.

A third cavity 60 formed by the lower strata 62 defining cavity 58 and the strata 64 which faces flange portion 50 includes stiffening means in the form of air pressure of approximately 10 p.s.i. contained therein or a coiled spring. The purpose of the spring means is to provide a memory seal so that the peripheral seal portion wants to return to the circular extended condition but may be rolled or inserted into a slightly out-of-round condition when passed through manway 20, for example.

The peripheral surface of flange portion 50 opposes a portion 66 of nozzle inside surface 16 which has been machined to cylindrical shape. The cylindrical portion 66 terminates in a radial surface 68 against which the nozzle dam is held in its flange portion area by a retaining ring 70. The ring 70 is hinged at 72 for easy passage through manway 22 and held by pins 74.

The pins 74 are spring loaded detent pins of the type commonly used in association with nozzle dams. They are generally described in U.S. Pat. No. 3,101,641 and are sold by Carr-Lane. They seat in pockets or inserts 74 provided in surface 16 of the nozzle. The bulkhead segments 44 and 48 contain flange portions which extend 360° when the segments are laid into place with their intersecting edges horizontally oriented. No mechanical fastener between segments is required, thus minimizing installation time and worker exposure to radiation.

The actual peripheral seal is best made up with a strata of closed cell rubber foam material 76 of 20 to 30 durometer hardness. The nozzle dam thus seats snugly with the peripheral seal means between flange 50 and cylindrical portion 66. The oppositely opening cavities 56 and 58 act in a manner described by those in the sealing art as "passive" or "chevron seals", depending on the direction of hydraulic pressure. The radial force thus created acts through the foam rubber material 76 to effect a seal with surface portion 66.

What is claimed is:

1. A nozzle dam for use in sealing a steam generator nozzle which includes in combination:
    means forming a bulkhead having a peripheral surface in opposing face-to-face relation with the inside surface of the nozzle;
    seal means between said peripheral surface and said inside surface of the nozzle; and
    said seal means including separate strata of flexible material defining separate and oppositely facing cavities whereby hydraulic forces from either side of said bulkhead creates a force in one of said cavities and on at least one of said strata to create a seal between said peripheral surface and said inside surface of the nozzle.

2. The nozzle dam of claim 1 in which in addition to the separate strata of flexible material defining separate and oppositely facing cavities, there is a strata of closed cell foam material.

3. The nozzle dam of claim 2 in which the closed cell foam material is 20 to 30 durometer rubber.

4. The nozzle dam of claim 1 in which the seal means includes a bulkhead sealing body portion and the means forming a bulkhead includes segments forming an inside bulkhead portion on one side of the seal means bulkhead sealing body portion and segments forming an outside bulkhead portion on the opposite side of the seal means bulkhead sealing body portion.

5. The nozzle dam of claim 4 in which the outside bulkhead portion includes a peripheral flange which backs up the seal means portion between said peripheral surface and said inside surface of the nozzle.

6. The nozzle dam of claim 5 in which a retaining ring is pinned in the nozzle to retain the dam.

7. The nozzle dam of claim 5 in which the retaining ring is hinged for easy passage into the steam generator.

8. The nozzle dam of claim 5 in which the peripheral surface opposes a cylindrical portion of the inside surface of the nozzle.

9. The nozzle dam of claim 8 in which the cylindrical surface portion of the inside surface of the nozzle terminates in a radial surface against which the nozzle dam is held by a retaining ring pinned in the nozzle.

10. The nozzle dam of claim 1 in which the means forming a bulkhead includes segments merely laid into place without a mechanical fastener between them.

11. The nozzle dam of claim 1 in which the seal means includes stiffening means in the form of a closed chamber for a spring means or for air pressure retention.

* * * * *